Nov. 27, 1923.
A. G. NEWHARD
1,475,313
CIRCUIT CONTROLLER
Filed Sept. 24, 1920
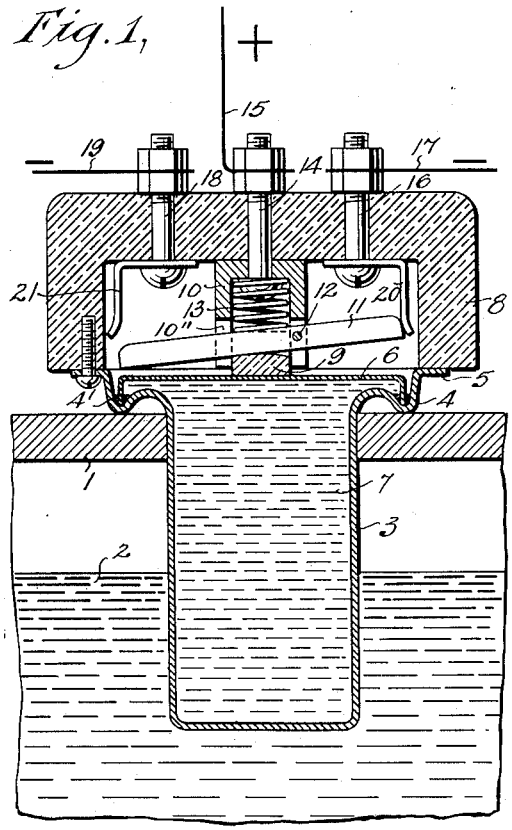
Fig.1,
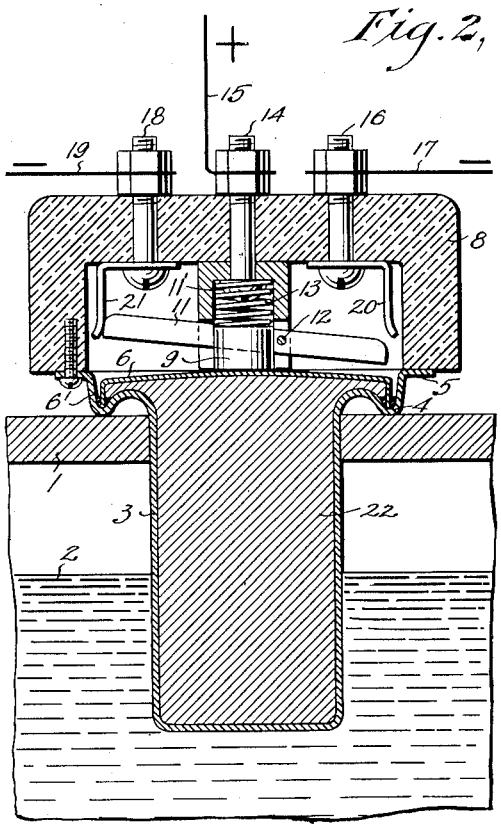
Fig.2,
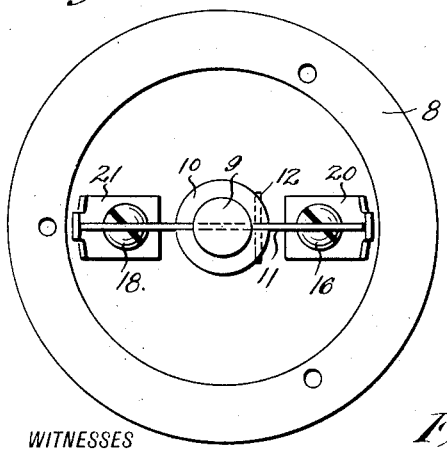
Fig.3,
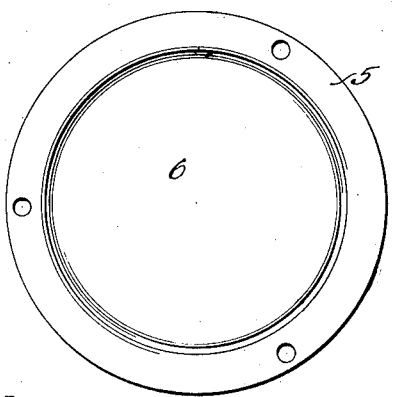
Fig.4,
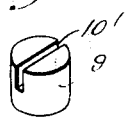
Fig.5.
WITNESSES
Edw. Thorpe
Robert I. Hulsizer
INVENTOR
A. G. Newhard
BY
ATTORNEYS Patented Nov. 27, 1923.

1,475,313

UNITED STATES PATENT OFFICE.

ALLEN G. NEWHARD, OF ALLENTOWN, PENNSYLVANIA.

CIRCUIT CONTROLLER.

Application filed September 24, 1920. Serial No. 412,577.

*To all whom it may concern:*

Be it known that I, ALLEN G. NEWHARD, a citizen of the United States, and a resident of Allentown, in the county of Lehigh and State of Pennsylvania, have invented a new and Improved Circuit Controller, of which the following is a full, clear, and exact description.

This invention relates to circuit controllers, and has particular reference to a thermostatically controlled device.

An object of the invention is to provide a circuit controller which is actuated from a normal into an abnormal position only when a liquid thermostatic unit freezes into a solid form.

Another object of the invention is to provide a simple, compact, and economical thermostatic unit adapted to be used particularly in connection with refrigerating apparatus.

A further object resides in the provision of means whereby a circuit closer is adapted normally to energize one circuit, and when actuated by the freezing of a liquid is adapted to close another circuit and effect certain electrical changes.

A still further object resides in the particular construction and arrangement of parts which will be hereinafter described and claimed and are shown in the accompanying drawings.

In refrigerating apparatus, when the freezing point has been reached in the refrigerated element or liquid, it is sometimes desirable to effect certain electrical changes in the operating apparatus of the system when the refrigerated element or liquid has reached this point. Other temperature changes in the refrigerated element or liquid are not so important. Consequently it is desirable to provide a thermostatic electric circuit controller which shall operate to actuate electrical devices only when the particular freezing temperature is reached. Therefore, my invention resides in the provision of a simple, compact thermostatic unit in which a circuit controller switch or other similar device is actuated when a suitable liquid contained within the receptacle freezes and changes in form from a liquid to a solid. Other temperatures to which the liquid in the above-mentioned receptacle is subjected do not affect the normal condition of the circuit controller. This idea, it is apparent, can be used for any particular purpose where the expansion of a liquid, such as water into a solid, can be utilized.

The invention is illustrated in the drawings, of which—

Figure 1 represents a vertical section with certain parts in elevation, showing my thermostatic circuit controller as applied to a channel in which circuit liquid, preferably refrigerating liquid, is contained;

Figure 2 represents a similar view showing the circuit element or switch in an abnormal position;

Figure 3 is an inverted plan view of the casing or cover of the device;

Figure 4 is a plan view of the liquid-containing receptacle; and

Figure 5 is a detail view of an element to which the switch arm is connected and through which it is operated.

As illustrated in the drawings, my invention is shown as applied to a casing 1 in which a liquid 2 is contained. This casing and liquid may form part of a refrigerating system the temperature of which it is desired to restrain within certain definite limits. It is generally desirous in systems of this character to operate certain electrical apparatus, such as motors or power switches, when the freezing temperature in the liquid has been reached.

My particular apparatus comprises a casing or cylindrical receptacle 3 having a reversely curved channel portion 4 and the proper exterior flange portion 5 which is adapted, by any suitable means, to be connected as hereinafter to be described. The upper open end of the receptacle 3 is adapted to be closed by a cylindrical disk provided with a depending flange portion 6' which normally projects into the channel portion 4 and the junction between which and the channel portion 4 is closed by suitable material 4', such as solder.

Within the receptacle 3 a suitable liquid 7 is disposed. This liquid may be water or any other suitable fluid, as desired. The flange portion 5 of the receptacle 3 may be fastened in any suitable manner to an insulating base or terminal block 8. This base or block 8 may be formed of fiber, hard rubber or any other suitable material. Within the block 8, and resting normally against the plate or disk 6, is a plug 9. The upper portion of this plug 9 is provided with a slot 10' through which a switch arm 11 is adapted normally to extend. This switch arm is pivoted at 12 in the slotted portion 10″ of another plug 10 which is fastened to the base or terminal block 8. Between the upper end of the plug 9 and the inner surface of a bore 11′ of the plug 10 is a spring 13. This spring 13 normally tends to keep the switch or circuit control arm 11 in the position shown in Figure 1. The plug 10, which is of metal, is electrically connected by means of the terminal 14 with a wire 15. Within the base or terminal block 8 are also contained a terminal 16, connected to a wire 17, and a terminal 18 connected to a wire 19. The terminal 16 is connected within the base 8 to a contact clip or spring 20, and the terminal 18 is connected similarly to a contact clip or spring 21.

In Figure 2 the liquid 7 is shown represented by the numeral 22, and is illustrated in this figure as being in the form of a solid having expanded, and this expansion has resulted in the upward movement of the central portion of the disk 6, whereby the plug 9 has moved upward against the action of spring 13 and moved the switch arm 11 around its pivot pin 12. This movement has caused the disconnection of the switch arm 11 from the switch clip or spring 20 and has connected the arm 11 with the clip or spring 21. By this movement the circuit wire 17 has been disconnected from the wire 15, and the circuit wire 19 has been connected thereto.

The particular apparatus to which the circuit wire is connected is not part of the invention and may be such as is suitable for whatever purpose the device is intended in each particular case. It should be observed however, that only during the slight temperature range, when the liquid is changed into a solid, is the switch arm 11 moved from the position shown in Figure 1 to the position shown in Figure 2.

The receptacle 3 can be suitably made of one piece of spun metal, and the other parts, as will be observed, are equally simple in their arrangement and their construction, whereby the device is rigid, compact, and economical in manufacture.

What I claim is:

1. A thermostatic device comprising a receptacle of spun metal, liquid within the receptacle, a disk-shaped cover for one end of said receptacle adapted to be connected thereto, a flange on said receptacle, an insulating terminal base attached to the flange portion and having a bore therein, an electrical switch within the bore, a plug cooperatively related to the switch and bearing against the disk, electric terminals within the base, one of which is adapted normally to be connected to the switch, and a spring back of the switch adapted to hold it in normal position, said switch adapted to be actuated from normal position when the liquid within the receptacle expands.

2. A thermostatic device which comprises a hollow base of insulating material, a flanged metallic receptacle to be disposed against the open end of the base and attached thereto, a flexible diaphragm disposed over the end of the receptacle adjacent the open end of the base, said receptacle adapted to contain a liquid, a centrally disposed plug fastened to the inner face of the base having a slot in its outer end, a switch arm pivoted to the plug in the slot, said plug having a bore therein, a movable plug in the bore and associated with the switch arm, and a spring disposed in the bore between the movable plug and the base of the stationary plug, said spring adapted normally to force the switch arm in one direction, the movable plug normally bearing against the diaphragm, the switch arm in its normal position closing a definite circuit, and when moved to an abnormal position by the arm of the diaphragm under the expansion of the liquid, adapted to break the normally closed circuit and establish a second circuit.

ALLEN G. NEWHARD.